US006670029B2

(12) United States Patent  
Norton et al.

(10) Patent No.: US 6,670,029 B2
(45) Date of Patent: *Dec. 30, 2003

(54) COMPOSITE FOOTWEAR UPPER AND METHOD OF MANUFACTURING A COMPOSITE FOOTWEAR UPPER

(75) Inventors: Edward J. Norton, Boxford, MA (US); Zenon O. Smotrycz, Reading, MA (US)

(73) Assignee: ADC Composites, LLC, Reading, MA (US)

( * ) Notice: Subject to any disclaimer, the term of this patent is extended or adjusted under 35 U.S.C. 154(b) by 83 days.

This patent is subject to a terminal disclaimer.

(21) Appl. No.: 09/948,984

(22) Filed: Sep. 7, 2001

(65) Prior Publication Data

US 2002/0012784 A1 Jan. 31, 2002

Related U.S. Application Data

(63) Continuation of application No. 09/514,419, filed on Feb. 28, 2000, now Pat. No. 6,558,784.
(60) Provisional application No. 60/122,351, filed on Mar. 2, 1999.

(51) Int. Cl.$^7$ .............................. B32B 3/26; B32B 5/26; A43B 23/00; B29D 31/50; B27N 3/10
(52) U.S. Cl. ................................ 428/308.4; 428/318.6; 442/30; 36/46.5; 36/49; 36/87; 264/244; 264/257; 12/145; 12/146 C
(58) Field of Search ............................ 428/304.4, 308.4, 428/542.8, 318.6, 319.7; 442/30, 56, 326, 324, 373; 36/87, 9 R, 45, 49, 46.5, 55, 98, 84, 93; 264/244, 257; 12/145, 146 C

(56) References Cited

U.S. PATENT DOCUMENTS

| 255,178 A | 3/1882 | Marshall |
| 878,572 A | 2/1908 | Squires et al. |
| 1,495,602 A | 5/1924 | Leroy, Jr. |

(List continued on next page.)

FOREIGN PATENT DOCUMENTS

| GB | 1124281 | * | 8/1968 |
| GB | 1322324 | | 7/1973 |
| JP | 10156970 A | | 6/1998 |
| WO | WO 90/03744 | * | 4/1990 |
| WO | 0 324 7303 A | | 11/1991 |
| WO | WO 00/36943 | | 6/2000 |
| WO | WO 00/51458 | | 9/2000 |

OTHER PUBLICATIONS

EP Search Report, dated Apr. 11, 2003 (EP 00914759.6).

* cited by examiner

Primary Examiner—Kiley Stoner
(74) Attorney, Agent, or Firm—Foley Hoag LLP

(57) ABSTRACT

A method of manufacturing a multi-layer, composite footwear upper having a three-dimensional geometry includes the steps of forming a substantially planar composite sheet from two or more layers, heating the composite sheet, and compression molding the composite sheet into the three-dimensional geometry of the footwear upper. The composite sheet is formed by laminating a first layer of thermoplastic foam to a second layer of thermoplastic urethane (TPU), preferably in the form of a TPU film. A third layer of mesh fabric can be interposed between the first and second layers. The composite sheet is compressed after heating in a mold cavity to achieve the desired three-dimensional geometry. The composite sheet can be compression molded into separate sections which are assembled after molding to form the footwear upper. Alternatively, the composite sheet can be compression molded into a seamless, unitary footwear upper that requires minimal, if any, assembly for completion. The multi-layer composite upper can be applied to a sole to form performance footwear suitable for use in a wide range of conditions.

36 Claims, 9 Drawing Sheets

U.S. PATENT DOCUMENTS

| | | | | |
|---|---|---|---|---|
| 2,450,490 | A | 10/1948 | Shinberg et al. | |
| 2,582,298 | A | 1/1952 | Ushakoff | 12/146 |
| 2,734,289 | A | 2/1956 | Heaton et al. | 36/68 |
| 2,904,838 | A | 9/1959 | Phillips, Jr. | |
| 3,050,432 | A | 8/1962 | Weinbrenner et al. | 156/196 |
| 3,113,906 | A | 12/1963 | Hamilton et al. | 161/165 |
| 3,234,065 | A | 2/1966 | Best | 156/224 |
| 3,355,535 | A | 11/1967 | Hain et al. | |
| 3,370,363 | A | 2/1968 | Kaplan | 36/9 |
| 3,427,733 | A | 2/1969 | Beckwith | 36/68 |
| 3,484,811 | A | 12/1969 | Krieger | 12/146 |
| 3,570,149 | A | 3/1971 | Kogert et al. | 36/2.5 |
| 3,641,603 | A | 2/1972 | Lockwood | 12/146 |
| 3,642,563 | A | 2/1972 | Davis et al. | 161/88 |
| 3,691,658 | A | 9/1972 | Di Perno et al. | 36/4 |
| 3,698,027 | A | 10/1972 | Schwab et al. | |
| 3,709,966 | A | 1/1973 | Cambardella | 264/46 |
| 3,720,971 | A | 3/1973 | Wyness et al. | 12/146 C |
| 3,739,414 | A | 6/1973 | Skelham | 12/142 R |
| 3,779,855 | A | 12/1973 | Fonzi et al. | 161/159 |
| 3,823,493 | A | 7/1974 | Brehm et al. | 36/2.5 R |
| 3,939,583 | A | 2/1976 | Daumann | 36/2.5 R |
| 4,150,455 | A | 4/1979 | Fukuoka | 12/142 RS |
| 4,266,314 | A | 5/1981 | Londner epouse Ours | 12/142 P |
| 4,346,140 | A | 8/1982 | Carlson et al. | |
| 4,349,597 | A * | 9/1982 | Fine et al. | |
| 4,350,732 | A | 9/1982 | Goodwin | 428/246 |
| 4,380,519 | A | 4/1983 | Carlson et al. | |
| 4,430,811 | A | 2/1984 | Okada | 36/45 |
| 4,433,494 | A | 2/1984 | Courvoisier et al. | 36/119 |
| 4,508,582 | A | 4/1985 | Fink | 156/93 |
| 4,509,276 | A | 4/1985 | Bourque | 36/115 |
| 4,529,641 | A | 7/1985 | Holtrop et al. | 428/198 |
| 4,581,187 | A | 4/1986 | Sullivan et al. | 264/46.4 |
| 4,651,444 | A | 3/1987 | Ours | 36/93 |
| 4,662,018 | A | 5/1987 | Autry | 12/142 |
| 4,766,014 | A | 8/1988 | Poletto | 427/245 |
| 4,778,717 | A | 10/1988 | Fitchmun et al. | 428/246 |
| 4,828,910 | A | 5/1989 | Haussling | |
| 4,858,339 | A | 8/1989 | Hayafuchi et al. | 36/45 |
| 5,036,838 | A | 8/1991 | Sherman | |
| 5,047,478 | A | 9/1991 | Ohmae et al. | |
| 5,068,001 | A | 11/1991 | Haussling | |
| 5,106,445 | A | 4/1992 | Fukuoka | 156/242 |
| 5,281,380 | A | 1/1994 | Umeda et al. | 264/108 |
| 5,296,182 | A | 3/1994 | Thary | 264/46.5 |
| 5,338,600 | A | 8/1994 | Fitchmun et al. | 428/213 |
| 5,343,638 | A | 9/1994 | Legassie et al. | 36/29 |
| 5,351,352 | A * | 10/1994 | Chillemi | |
| 5,389,318 | A | 2/1995 | Thary | 264/46.5 |
| 5,395,681 | A * | 3/1995 | Hargarter et al. | |
| 5,395,826 | A | 3/1995 | Naumann et al. | |
| 5,401,456 | A | 3/1995 | Alesi, Jr. et al. | |
| 5,401,564 | A | 3/1995 | Lee et al. | 428/228 |
| 5,416,987 | A | 5/1995 | Bemis et al. | 36/50.1 |
| 5,426,869 | A | 6/1995 | Gore et al. | 36/22 |
| 5,529,826 | A * | 6/1996 | Tailor et al. | |
| 5,575,089 | A | 11/1996 | Giese et al. | |
| 5,604,997 | A | 2/1997 | Dieter | 36/45 |
| 5,617,650 | A | 4/1997 | Grim | 36/88 |
| 5,623,019 | A | 4/1997 | Wiggins et al. | |
| 5,637,407 | A | 6/1997 | Hert et al. | 428/474.7 |
| 5,647,147 | A | 7/1997 | Coomer | |
| 5,647,150 | A | 7/1997 | Romanato et al. | 36/117.1 |
| 5,667,857 | A | 9/1997 | Watanabe et al. | 422/36.2 |
| 5,688,890 | A | 11/1997 | Ishiguro | 528/51 |
| 5,714,229 | A | 2/1998 | Ogden | 428/138 |
| 5,733,647 | A | 3/1998 | Moore, III et al. | 428/304.4 |
| 5,738,937 | A | 4/1998 | Baychar | 428/316.6 |
| 5,744,231 | A | 4/1998 | Igarashi et al. | 428/318.6 |
| 5,755,045 | A | 5/1998 | Mashita et al. | 36/84 |
| 5,776,993 | A | 7/1998 | Shin et al. | |
| 5,778,473 | A | 7/1998 | Chen | 12/142 T |
| 5,832,634 | A | 11/1998 | Wong | |
| 5,843,851 | A | 12/1998 | Cochran | 442/63 |
| 5,885,500 | A | 3/1999 | Tawney et al. | 264/154 |
| 5,918,338 | A | 7/1999 | Wong | |
| 5,940,991 | A | 8/1999 | Cabalquinto | 36/98 |
| 5,970,629 | A | 10/1999 | Tucker et al. | |
| 5,974,698 | A * | 11/1999 | Nash et al. | |
| 6,007,748 | A | 12/1999 | Krajcir | |
| 6,012,236 | A | 1/2000 | Pozzobon | 36/55 |
| 6,025,287 | A | 2/2000 | Hermann | 442/370 |
| 6,048,810 | A | 4/2000 | Baychar | 442/370 |
| 6,082,025 | A | 7/2000 | Bonk et al. | |
| 6,103,047 | A | 8/2000 | Ogawa | 156/245 |
| 6,127,026 | A | 10/2000 | Bonk et al. | |
| 6,138,057 | A | 10/2000 | Stotsky | |
| 6,156,403 | A | 12/2000 | Cochran | 428/58 |
| 6,159,589 | A | 12/2000 | Isenberg et al. | 428/220 |
| 6,237,251 | B1 | 5/2001 | Litchfield et al. | |
| 2002/0012784 | A1 * | 1/2002 | Norton et al. | |
| 2002/0071946 | A1 * | 6/2002 | Norton et al. | |

COMPOSITE FOOTWEAR UPPER AND METHOD OF MANUFACTURING A COMPOSITE FOOTWEAR UPPER

REFERENCE TO RELATED APPLICATIONS

The present application is a continuation of U.S. patent application Ser. No. 09/514,419 now U.S. Pat. No. 6,558,784, filed Feb. 28, 2000, which claims priority to U.S. Provisional Application No. 60/122,351, filed Mar. 2, 1999. Each of the aforementioned patent applications is incorporated herein by reference in its entirety.

BACKGROUND OF THE INVENTION

Many outdoor activities require performance footwear designed for use in extreme conditions. Performance footwear such as hiking boots, ski boots, snowboard boots, mountaineering boots, etc., can provide the wearer with protection from extreme temperatures, from moisture, and from foot injuries due to difficult terrain. To provide such protection, performance footwear is typically constructed from a material or a combination of materials having insulative, moisture resistant, and abrasion resistant characteristics.

The processes for constructing performance footwear can be labor intensive and costly and often require sophisticated and expensive molding and stitching equipment. For example, constructing performance footwear from leather requires hand cutting and hand stitching of the leather. Likewise, constructing performance footwear from plastic materials necessitates the use of expensive and complicated high-pressure injection equipment and molds.

In addition, the construction of performance boots often necessitates multiple layers of materials to be applied in sequence to one another to provide the desired insulative, moisture resistant, and abrasion resistant properties. This can result in bulky and heavy footwear that is uncomfortable to wear and difficult and time consuming to manufacture.

SUMMARY OF THE INVENTION

The present invention provides methods of manufacturing footwear and footwear uppers that simplifies the footwear manufacturing process, reduces manufacturing costs, and results in the construction of comfortable footwear having the properties necessary for use in extreme conditions. Moreover, the methods of the present invention provide the flexibility to vary the properties of the resultant footwear, allowing the footwear to be specifically tailored to the environment in which it is designed to be used, without the need for multiple sets of molds or manufacturing equipment.

In accordance with one aspect, the present invention provides a method of manufacturing a footwear upper having a three-dimensional geometry. The method includes the steps of forming a composite sheet from two or more layers, heating the composite sheet, and compression molding the composite sheet into the three-dimensional geometry of the footwear upper. The composite sheet can be formed by the lamination of two or more layers. The layers can be bonded together by a bonding agent, can be heat bonded, or can be laminated together by other means.

It is preferable that one or more of the layers forming the composite sheet includes a thermoformable material. In one preferred embodiment, the composite sheet comprises a first layer of thermoplastic foam and a second layer of thermoplastic urethane (TPU), preferably in the form of a TPU film. The thermoplastic foam can be, for example, ethylene vinyl acetate (EVA) foam. A third layer of fabric can be interposed between the first and second layers. Suitable fabrics can include a mesh fabric formed from nylon, polyester, polycotton, cotton, acetate, or acrylic.

In accordance with another aspect of the present invention, the composite sheet can comprise a first layer of cloth material, a second layer of thermoplastic foam, and a third layer of cloth material. The cloth material can be formed from felt, wool, fur, hair, polyester, nylon, cotton, acetate, or acrylic. In one embodiment, the composite sheet can be formed by needle punching the first, second, and third layers to thread the fibers forming the cloth material of the first and third layer through the second layer, thereby coupling the three layers together.

In accordance with a further aspect of the present invention, the step of compression molding includes the steps of positioning the composite sheet in a first mold member having a mold cavity and compressing the composite sheet in the mold cavity with a second mold member. The composite sheet can be heated prior to positioning the composite sheet into the first mold member or after the composite sheet is positioned in the first mold member, for example when the composite sheet is positioned in the mold cavity of the first mold member. The composite sheet can be compression molded into separate sections which are assembled after molding to form the footwear upper. Alternatively, the composite sheet can be compression molded into a seamless, unitary footwear upper that requires minimal, if any, assembly for completion.

A method of manufacturing footwear in accordance with the present invention includes the steps of constructing an upper by forming a substantially planar composite sheet from two or more layers, heating the composite sheet, and compression molding the composite sheet into the three-dimensional geometry of the upper. The upper can then be attached to a sole. The upper can be attached to the sole by stitching a sock into the upper, placing the upper on a last, attaching the upper to the sole, and removing the last from the upper after attaching the sole to the upper.

In accordance with another aspect of the present invention, an inner liner can be assembled within the upper. The inner liner can be a fabric or composite booty that can be stitched to the upper or can be separate and removable from the upper. In the alternative, a layer forming the inner liner can be attached to the composite sheet prior to the step of compression molding the composite sheet.

A multi-layer composite footwear upper in accordance with one aspect of the present invention can include a first layer of thermoplastic foam and a second layer of thermoplastic urethane (TPU), preferably in the form of a TPU film, attached to the first layer. The composite upper is preferably of unitary, seamless construction. A third layer of fabric can be interposed between the first and second layers. The thermoplastic foam can be, for example, ethylene vinyl acetate (EVA) foam. The fabric is preferably a mesh fabric formed from, for example, nylon, polyester, polycotton, cotton, acetate, or acrylic.

BRIEF DESCRIPTION OF THE DRAWINGS

These and other features and advantages of the present invention will be more fully understood by reference to the following detailed description in conjunction with the attached drawings in which like reference numerals refer to like elements through the different views. The drawings illustrate principles of the invention and, although not to scale, show relative dimensions.

DETAILED DESCRIPTION OF PREFERRED EMBODIMENTS

The present invention provides methods for manufacturing footwear uppers and, in general, footwear in which a multi-layer composite sheet is heat activated to become malleable and than placed in a mold. The mold is used to compress the composite sheet into a desired three-dimensional geometry to form the composite upper. The resultant composite upper can be joined to a sole, as well as other footwear components, to complete the construction of the footwear. The manufacturing methods of the present invention simplify footwear construction, reduce manufacturing costs, and provide the flexibility to construct a footwear upper, and thus footwear, have a variety of different properties.

Figure 1:
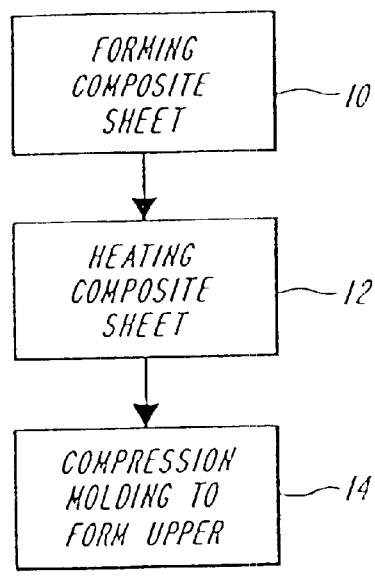
FIG. 1 is a flow chart illustrating a method of manufacturing a footwear upper according to the teachings of the present invention.

A method of manufacturing a footwear upper in accordance with the present invention is generally illustrated in the flowchart of FIG. 1. A substantially planar composite sheet is formed from two or more layers of material, step 10. The substantially planar sheet is heat activated to become malleable, step 12. Once heated, the substantially planar composite sheet is compression molded into the desired three-dimensional geometry of the footwear upper, step 14.

Figure 2:
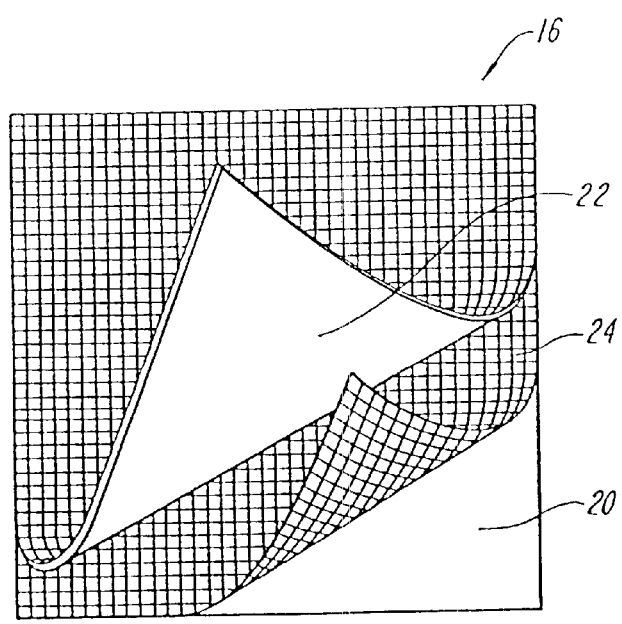
FIG. 2 is a multi-layer composite sheet used to construct a footwear upper according to the teachings of the present invention.

FIG. 2 illustrates an exemplary substantially planar composite sheet 16. It is preferable for one of the layers forming the composite sheet 16 to include a thermo-formable material that becomes malleable (formable) when heated above a specific temperature. The thermo-formable material can be, for example, a thermoplastic material, although other thermo-formable materials may be used. Thermoplastic materials are desirable because, when heated above a characteristic activation temperature, thermoplastic materials become malleable and, upon cooling below the activation temperature, thermoplastic materials set and maintain the desired form and shape. Exemplary thermoplastic materials include, but are not limited to, thermoplastic urethanes and polyurethanes, ethylene vinyl acetate (EVA).

Continuing to refer to FIG. 2, the exemplary composite sheet 16 comprises a first layer 20 of thermoplastic foam, such as EVA foam, and a second layer 22 of thermoplastic urethane (TPU). Other thermoplastic foams include, but are not limited to, polyethylene foam and polypropylene foam. In a preferred embodiment, a third layer 24 of fabric can be interposed between the first layer 20 and the second layer 22. The fabric is preferably a mesh material formed from fabrics such as nylon, polyester, polycotton, cotton, acetate, or acrylic. Although a woven fabric can be employed, a non-woven or knit fabric is preferred for the third layer 24 because of the increased stretchability provided. The second layer 22 of TPU and the underlying third layer 24 of mesh fabric are selected to provide the upper, as well as the resultant footwear, with a moisture and wear resistant outer layer. The first layer 20 of thermoplastic foam is selected to provide the upper, as well as the resultant footwear, with an insulative inner layer. The amount of insulation can depend of the thickness and density of the thermoplastic foam selected. Thus, the combination of layers forming the composite sheet 16 provide the composite sheet, as well as the upper formed therefrom and the resultant footwear, with a variety of properties.

One skilled in the art will appreciate that the composite sheet 16 is not limited to three layers as illustrated in FIG. 2 and described above. Any number of layers can be used, depending on the desired properties of the footwear being constructed. For example, the thickness, hardness, density, or color, etc. of the composite sheet 16 can be varied by changing, adding, removing, or moving layers of the composite sheet 16. Likewise, the degree of water resistance, thermal protection, and abrasion and wear resistance can be varied.

For example, in an alternative embodiment, the composite sheet can include an additional layer of a thermoset material, such as a thermoset urethane, over the second layer 22 of TPU. The additional layer of thermoset material can provide increased abrasion resistance and increased flexibility to the composite sheet and the molded composite upper.

Figure 6:
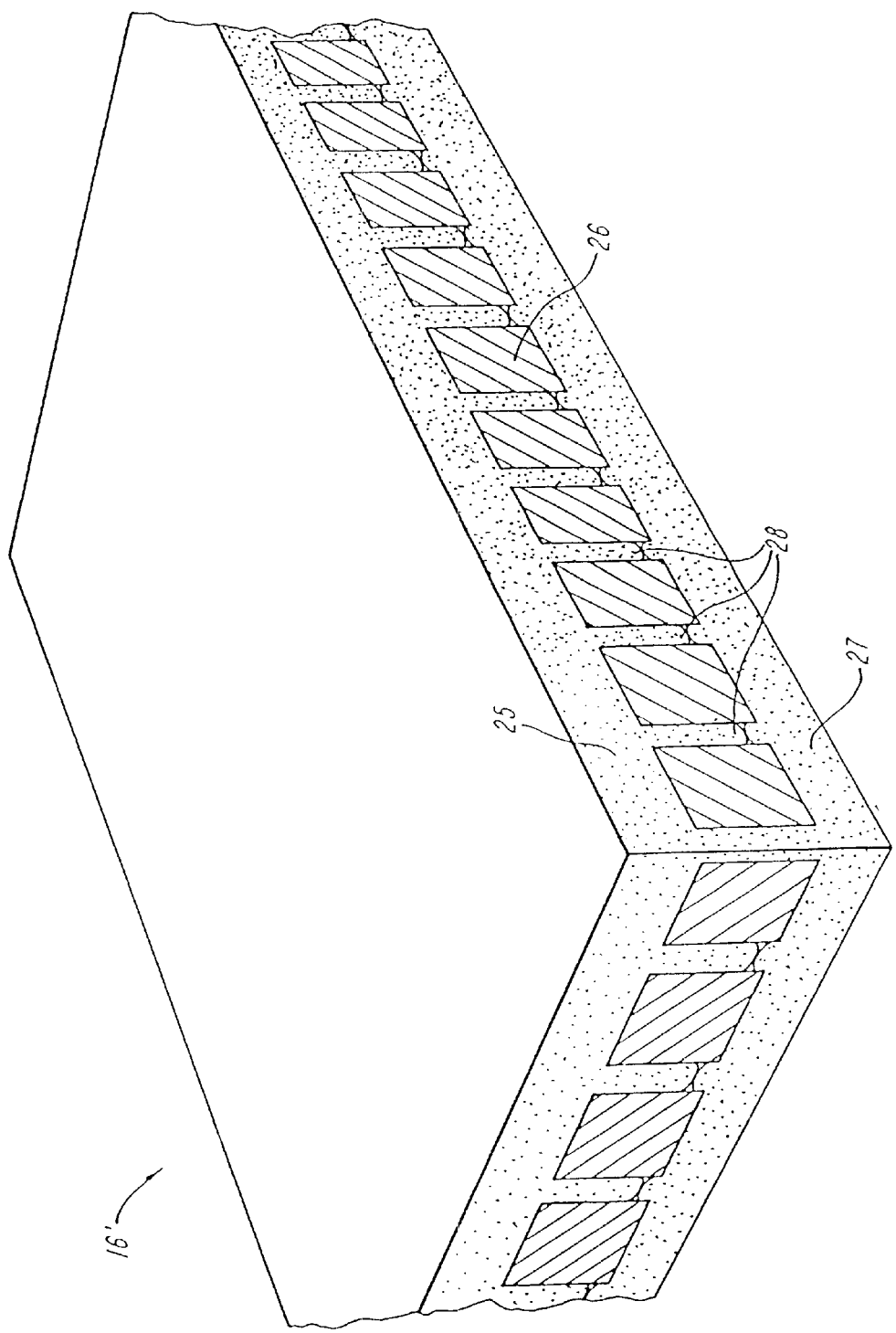
FIG. 6 is a perspective view of an alternative embodiment of a multi-layer composite sheet used to construct a footwear upper according to the teachings of the present invention.

FIG. 6 illustrates an alternative embodiment of the composite sheet 16' having a first layer 25 of cloth material, a second layer 26 of thermoplastic foam, and a third layer 27 of cloth material. The cloth material forming the first and third layers 25, 27 is preferably felt. The term "felt" used herein includes, but is not limited to, cloth constructed from woven or non-woven synthetic or natural fibers. Other suitable cloth materials for the first and third layers include, but are not limited to, wool, far, hair, polyester, nylon, cotton, acetate, and acrylic. The cloth material of the first layer 25 can be the same or different than the cloth material of the third layer 27. The first, second, and third layer can be bonded together with a bonding agent or attached by other means. In addition, the first, second, and third layers 25, 26, 27 are preferably connected by forcing fibers of either the first or third layer through the second layer of thermoplastic foam. For example, the first layer 25 of cloth material can be needle punched to drag fibers 28 through the thermoplastic foam of the second layer 26. The needle-punched fibers 28 are interweaved or interconnected with the fibers forming the third layer 27 of cloth material to thereby connect the three layers.

Figure 3:
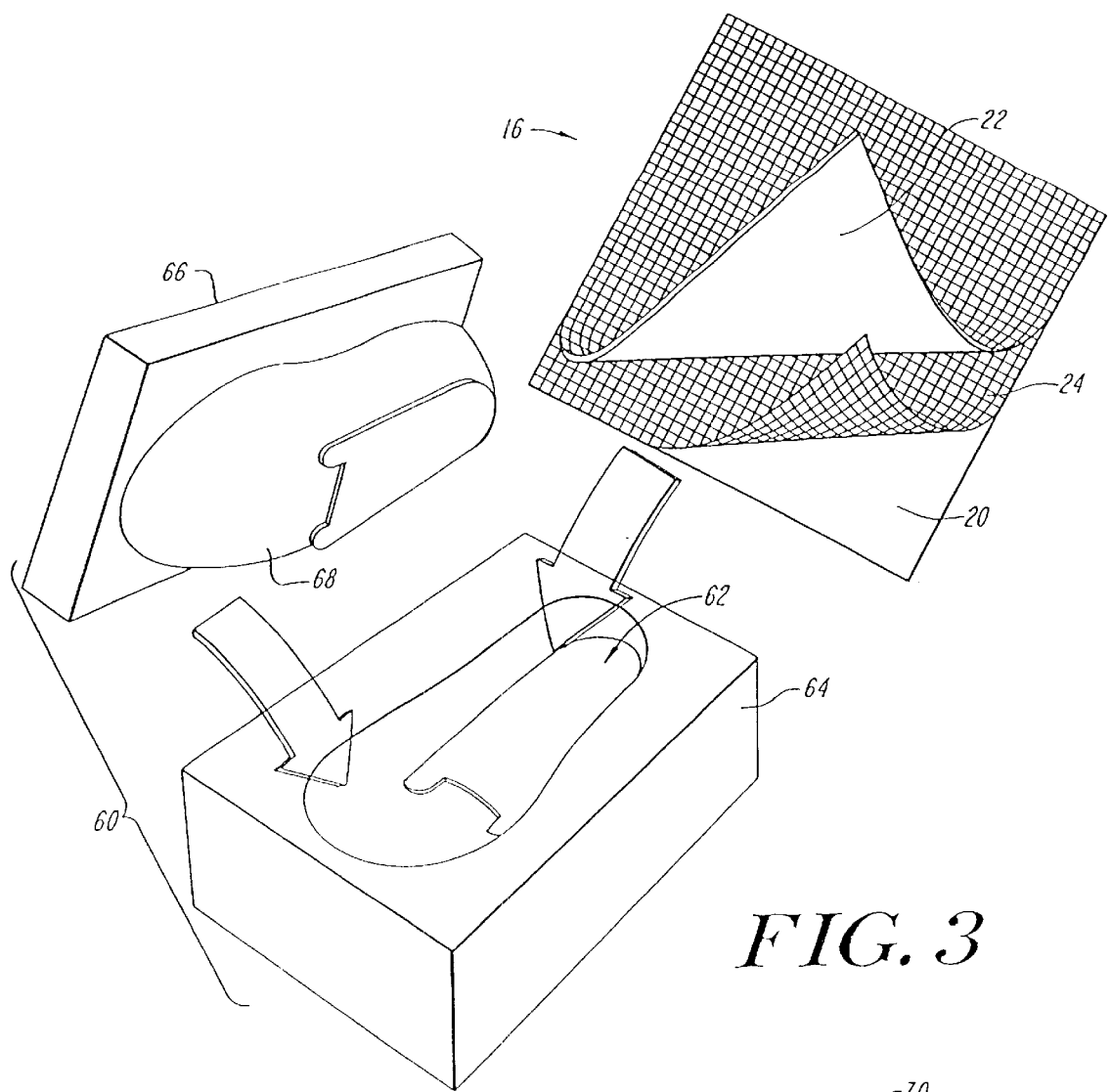
FIG. 3 is a schematic illustration of a method of manufacturing a footwear upper according to the teachings of the present invention.
Figure 4:
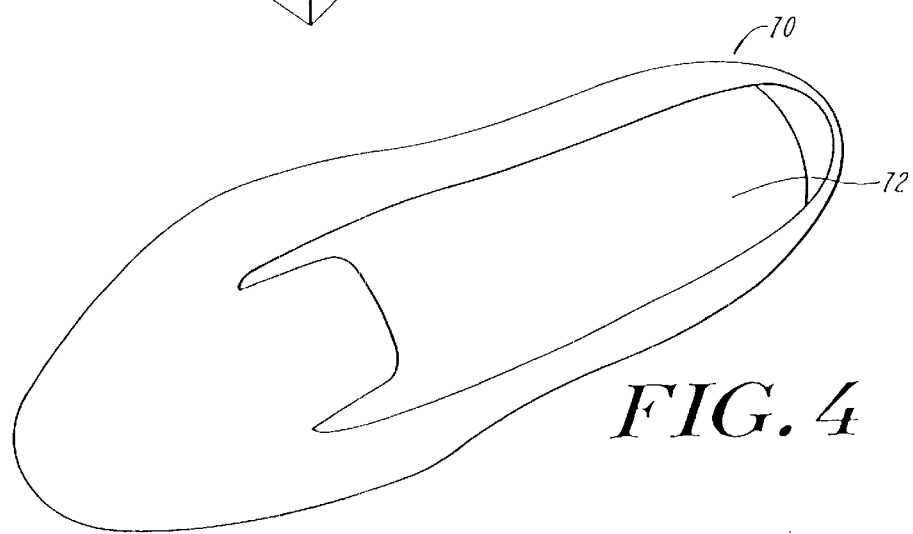
FIG. 4 is a perspective view of a footwear upper constructed in accordance with the teachings of the present invention.
Figure 5A:
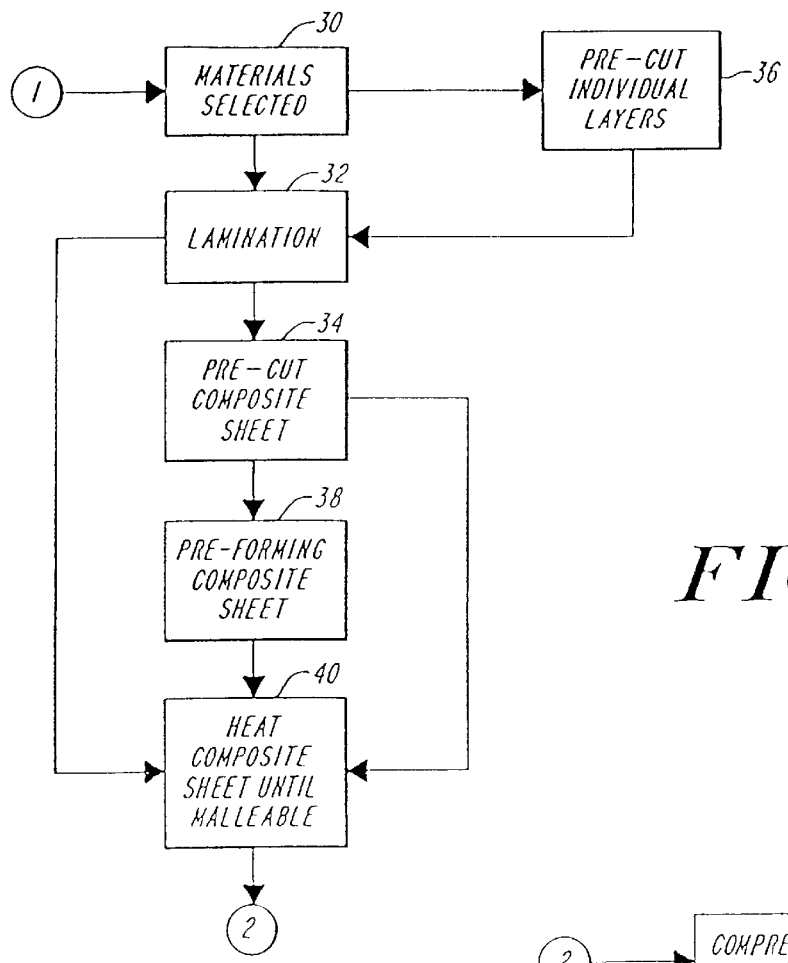
FIGS. 5A and 5B are flow charts illustrating a method of manufacturing footwear according to the teachings of the present invention.

Referring to FIGS. 3, 4, and 5A, a method of manufacturing a composite upper having a seamless, unitary construction will be described. To begin with, the materials are selected for forming the composite sheet 16, step 30, based on the desired properties of the composite upper. For purposes of the present description the three layer composite sheet described above will be used, however, one skilled in the art will recognize that any number of layers and a range of materials may be used to form the substantially-planar composite sheet. The materials selected can then be laminated together, for example, by bonding with an adhesive or by heat bonding, to form the substantially planar composite sheet 16, step 32.

The composite sheet 16 can be optionally pre-cut to the general shape of the composite upper to facilitate placement within the mold cavity 62 of the mold 60 used to form the composite upper, step 34. This step of pre-cutting is generally referred to as "die-cutting." As best illustrated in FIG. 3, the mold 60 comprises a first mold member 64 that includes the mold cavity 62 and a second mold member 66 having a "male" projection 68 analogous in shape to the mold cavity 62. The mold cavity 62 and the corresponding projection 68 are sized and shaped to form a unitary, i.e. single piece, footwear upper 70, as illustrated in FIG. 4. In this regard, the mold cavity 62 defines a three-dimensional shape having a length, a width, and a depth or height corresponding, i.e., equal to, to the length, width, and depth or height of the footwear upper 70.

Alternatively, the individual layers of materials can be pre-cut to the general shape of the mold cavity 62 prior to the step of laminating the layers together to form the composite sheet 16, step 36.

The die-cut composite sheet 16 can optionally be rough-formed prior to molding such that the composite sheet 16 better conforms to the geometry of the mold cavity 62, step 38. Rough forming can include providing a preliminary three-dimensional geometry to the composite sheet 16. This can be accomplished, for example, by removing a section of the die-cut composite sheet and then attaching the cut edges such that the composite sheet is no longer substantially planar. Rough forming can also include forming score lines at predetermined locations on the composite sheet 16 to facilitate cutting and removal of material from the footwear upper after molding.

Although it is preferably that the composite sheet be die-cut and rough formed prior to molding, it should be understood that the die-cutting step and the rough forming step are optional steps, as illustrated by the flowchart of FIG. 5A. In other words, once the composite sheet is formed, the composite sheet can be immediately heated and compressed, without proceeding with either or both of these steps.

Prior to or during the step of compression molding the composite sheet, the composite sheet is preferably heated so that composite sheet becomes malleable or formable, step 40. Heating of the composite sheet can occur within the mold 60 by, for example, heating the mold cavity 62 and/or the projection 68. Alternatively, the composite sheet can heated prior to placement within the mold cavity 62 by other heating means. In the case of a composite sheet formed using thermoplastic materials, the composite sheet is heated to or above the heat activation temperature of the thermoplastic material.

Figure 5B:
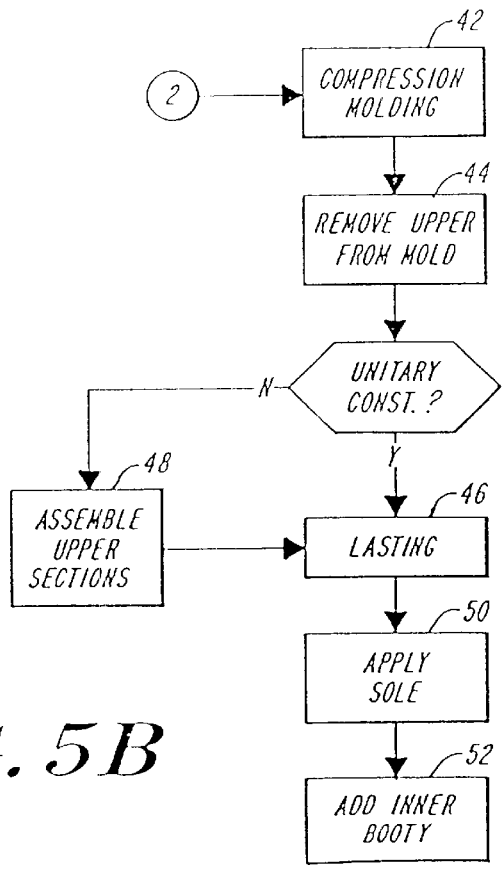

Referring to FIG. 5B, the heated composite sheet is compression molded within the mold 60, step 42. Compression molding can occur by pressing or forcing the projection 68 into contact with the composite sheet within the mold cavity 62. Alternative compression molding techniques can also be used. For example, a vacuum source can be coupled to the mold cavity 62 to apply a vacuum force to the under side of the composite sheet. Likewise, positive fluid pressure can be used independently or in cooperation with the compression provided by projection 68 to compress the composite sheet.

After compression molding, the molded composite upper is cooled to allow the materials forming the upper to set in the molded shape. After cooling, the composite upper is removed from the mold cavity 62, step 44. Compression molding of the composite sheet results in single piece footwear upper 70 that does not require further assembly, such as stitching, and, thus, is completely seamless, as illustrated in FIG. 4. Any excess material can be trimmed from the molded upper and the collar and throat area 72 can be punched-out, cut away, or otherwise removed from the upper. Eyelets holes or loops for laces, a collar, and a tongue can be added to the composite upper 70 if desired.

Continuing to refer to the FIG. 5B, the completed composite upper can be assembled with other footwear components to form an article of footwear, e.g., a shoe or a boot, etc. The general steps for assembling the upper and other footwear components into footwear are set forth in the flow-chart of FIG. 5B. One skilled in the art will appreciate that additional or fewer steps may be necessary depending on the footwear being manufactured.

The unitary composite upper can be lasted according to known lasting methods, step 46. As discussed in greater detail below, the method of forming a composite upper of the present invention is not limited to the formation of a single piece, seamless footwear upper. By changing the geometry of the mold cavity, a multi-section composite upper can be manufactured. In the case of a multi-section composite upper, the sections of the upper are assembled prior to lasting, step 48.

An exemplary lasting procedure involves stitching a bottom, generally referred to as a sock, to the bottom peripheral edge of the composite footwear upper. The sock can be made from a fabric material or any other soft, flexible, stitchable material. The upper and the sock are then placed on a last or foot form. Prior to adding the sole unit, the portions of the lasted upper which will contact the sole can be prepared by roughing, priming, and/or cementing the contact points. The sole unit is then applied to the lasted upper, step 50. The sole unit can be applied by any known method including, for example, by bonding the sole unit to the lasted upper or by injecting the material forming the sole unit onto the upper. It is preferable to prepare the sole unit for assembly to the upper in the same manner as with the upper, by roughing, priming, and/or cementing the contact points of the sole unit. Any type of sole unit can be applied to the composite upper depending of the type of footwear being manufactured Once the sole unit is bonded to the composite upper the last is removed from the upper.

An inner liner, generally referred to as an inner booty, can be optionally assembled within the composite upper depending on the type of footwear being manufactured, step 52. The inner liner can be inserted into the lasted upper before or, preferably, after the sole unit is applied. The inner liner can be constructed of a fabric material or a composite material that can be stitched into the composite upper or attached by other means to the composite upper. It is not necessary, however, for the inner liner to be attached to the composite upper. Instead, the inner liner can be separate and removable from the composite upper. Alternatively, the inner liner can be assembled with the layers forming the composite sheet prior to compression molding the composite sheet into the composite upper. In this manner, the inner liner is an integral layer of the composite sheet and the resultant composite upper.

The methods of manufacturing a footwear upper in accordance with the present invention provide numerous advantages over conventional footwear manufacturing methods. The manufacturing methods of the present invention permit the construction of a seamless composite upper of unitary construction. This results in a reduction of manufacturing costs by minimizing assembly steps and reducing cutting and stitching time significantly. The compression molding processes of the present invention permit the creation of more comfortable, better fitting footwear by allowing anatomically correct contours to be formed in the mold cavity, and, thus, the molded composite upper. Surface variances can molded into either side, i.e., inside or outside, of the composite upper to enhance the aesthetic appearance and the functionality of the composite upper. For example, grooves or channels can be molded into the inner surface of the composite upper to create a space or spaces between the composite boot and the foot and thereby enhance the breathability of the composite upper. Protrusions can be molded into the outer surface of the composite upper to create initial contact points that can protect recessed regions of the outer surface of the composite upper from abrasion. Additionally, grooves can be molded into the outer surface of the composite upper to provide increased bendability or flexibility to the composite upper at the locations of the grooves.

Additionally, the compression molding processes of the present invention allow many different composite upper types to be created from a single compression mold by varying the materials use to form the composite sheet. A wide range of properties, such as weight, breathability, water resistance, insulation, flexibility, durability, rigidity, etc. can be imparted to the molded composite upper and the resultant footwear singularly or in combination depending on the materials used to form the composite sheet.

Figure 7B:
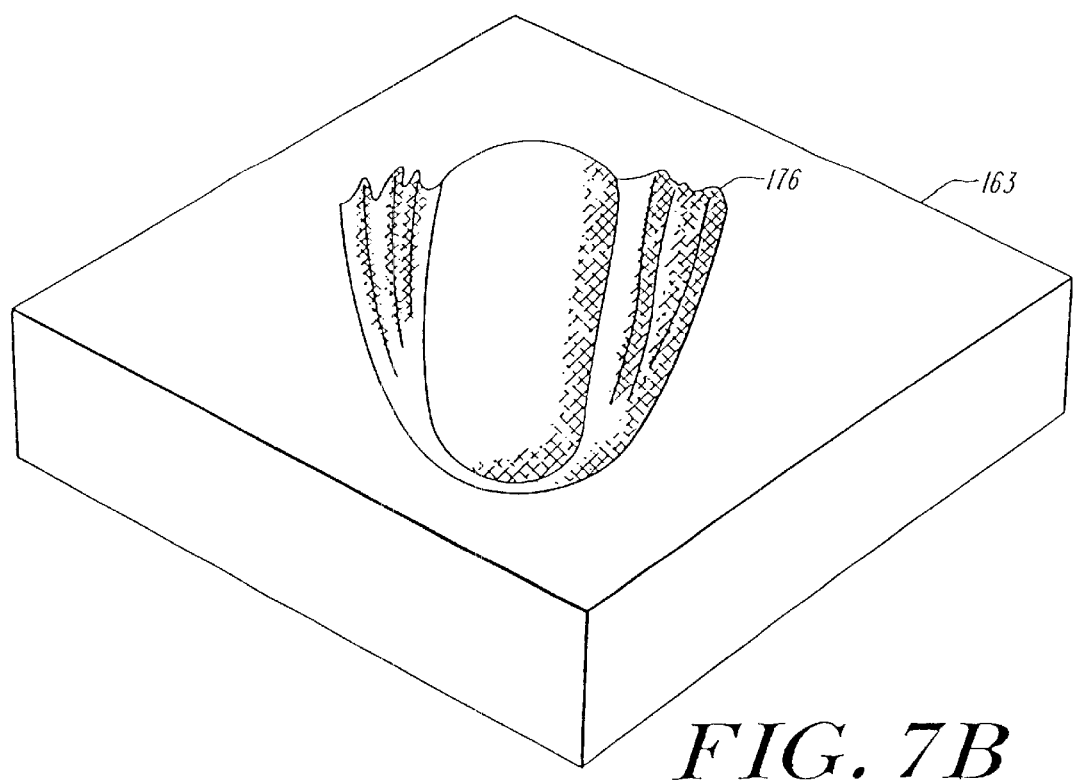
FIG. 7B is a perspective view of a mold used to form a footwear tongue according to the teachings of the present invention.
Figure 7A:
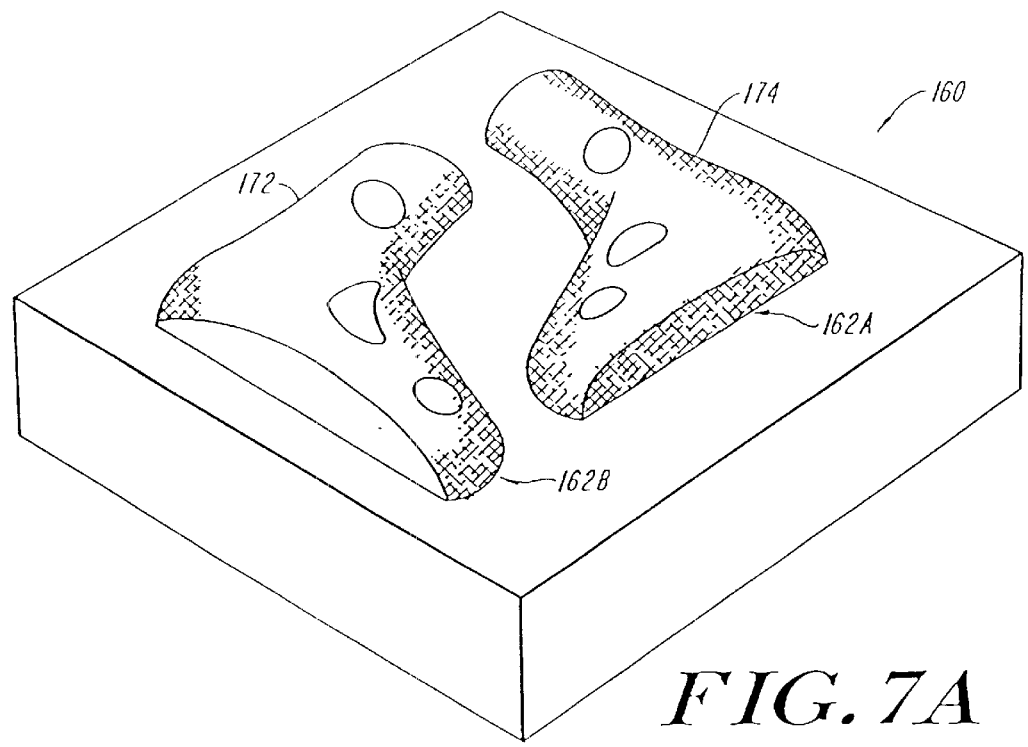
FIG. 7A is a perspective view of a mold for forming a footwear upper according to the teachings of the present invention.
Figure 7C:
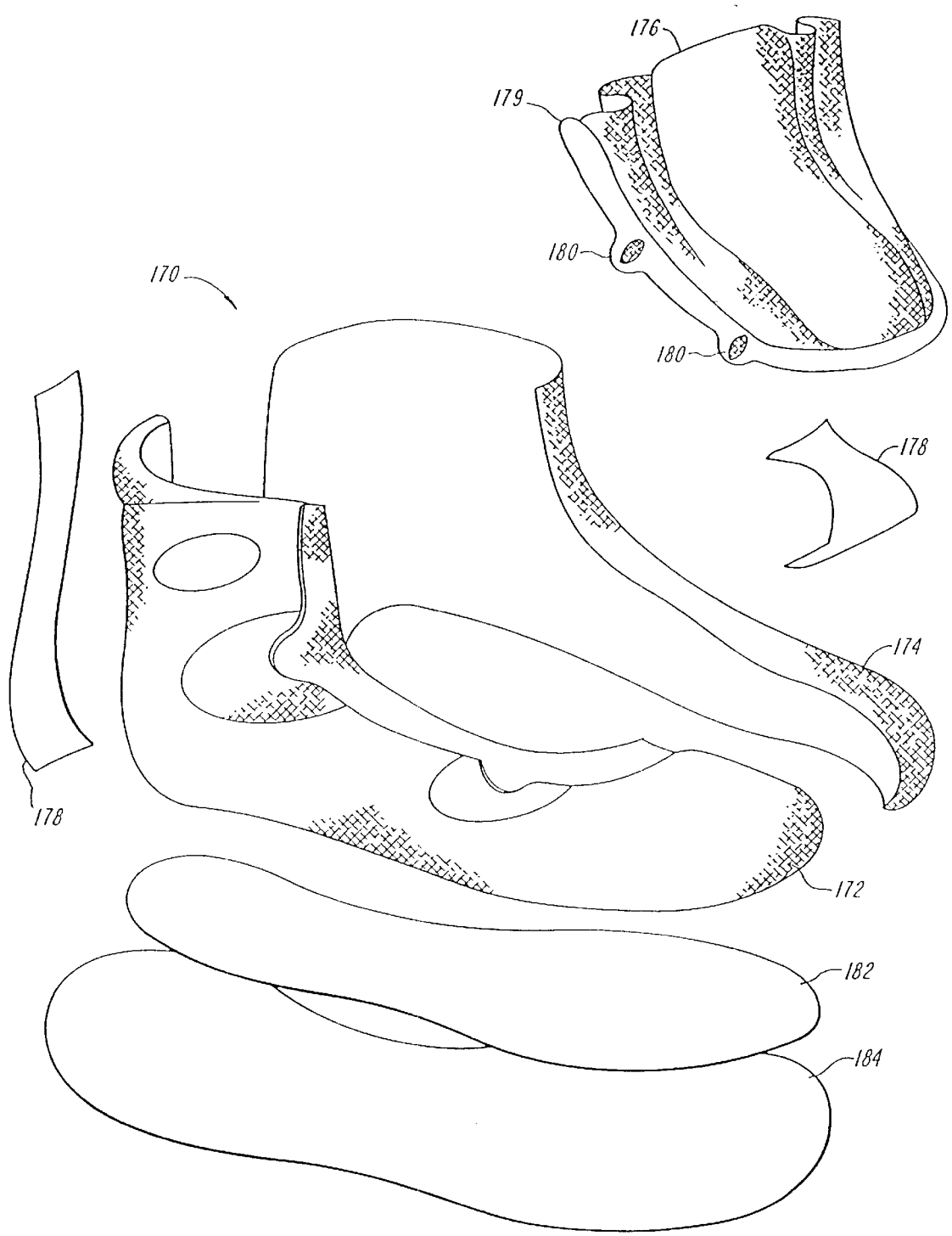
FIG. 7C is an exploded view of the components of a footwear upper constructed in accordance with a method of manufacturing footwear of the present invention.

As discussed above, the composite upper can be compression molded into multiple sections which are assembled post-molding to form the composite upper. FIGS. 7A–C and 8A–C illustrate exemplary multi-section composite uppers formed according to the methods of the present invention. Referring to FIGS. 7A–7C, a multi-section composite upper 170 is compression molded into two separate sections, 172 and 174, each representing a longitudinal half of the assembled upper 170. A mold 160 having two mold cavities, a first mold cavity 162B corresponding in size and shape to one longitudinal half of the upper and a second mold cavity 162B corresponding in size and shape to the other longitudinal half of the upper, is used to compression mold the composite sheet. A second mold 163 can be used to form a composite tongue 176 for the composite upper 170 in a manner analogous to the method of creating the composite upper.

FIG. 7C illustrates the components of the composite upper 170 formed according to the manufacturing methods of the present invention. After molding, the composite sections 172 and 174 are assembled by stitching, by bonding, or by other conventional methods. Seam covers 176 in the form of rubber strips can be placed over the seam or junction between the sections 172 and 174. The composite tongue 176 can be provided with a leather or synthetic eyestay 179 having eyelets 180 for laces and is assembled to the upper 170. A sock 182 for lasting is stitched to the lower peripheral edge of the composite upper 170. A rubber outsole 184 is applied to the sock 182.

Figure 8B:
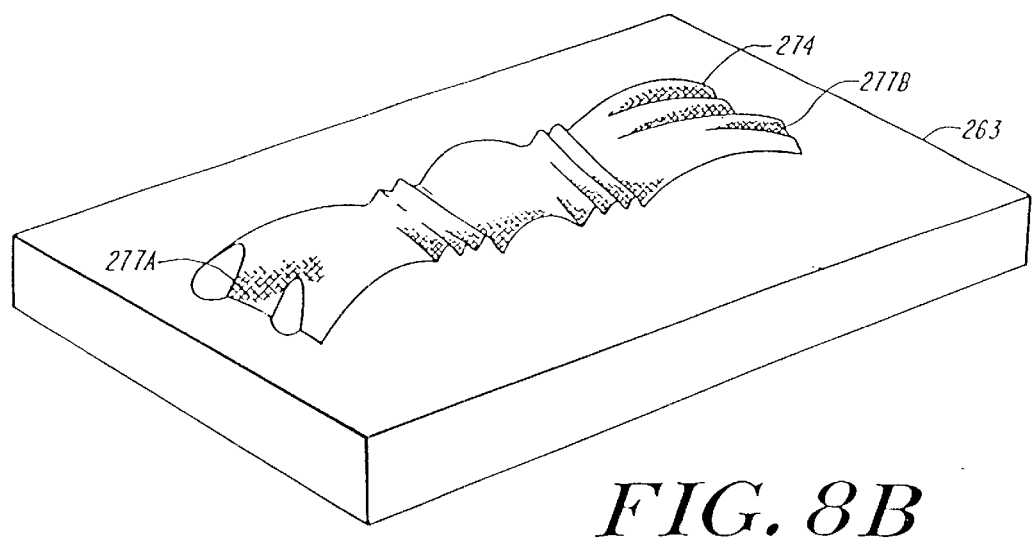
FIG. 8B is a perspective view of a mold used to form an upper shaft according to the teachings of the present invention.
Figure 8A:
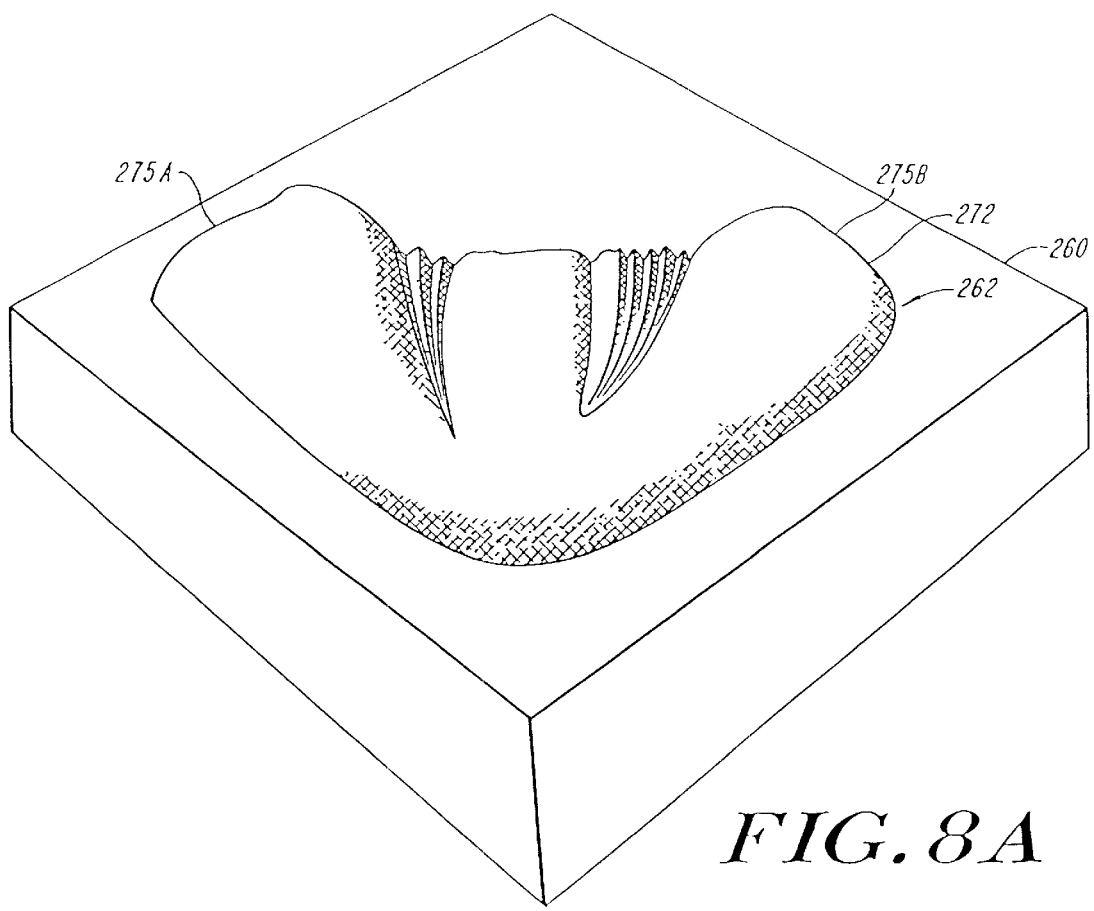
FIG. 8A is a perspective view of a mold for forming the lower portion of a footwear upper according to the teachings of the present invention.
Figure 8C:
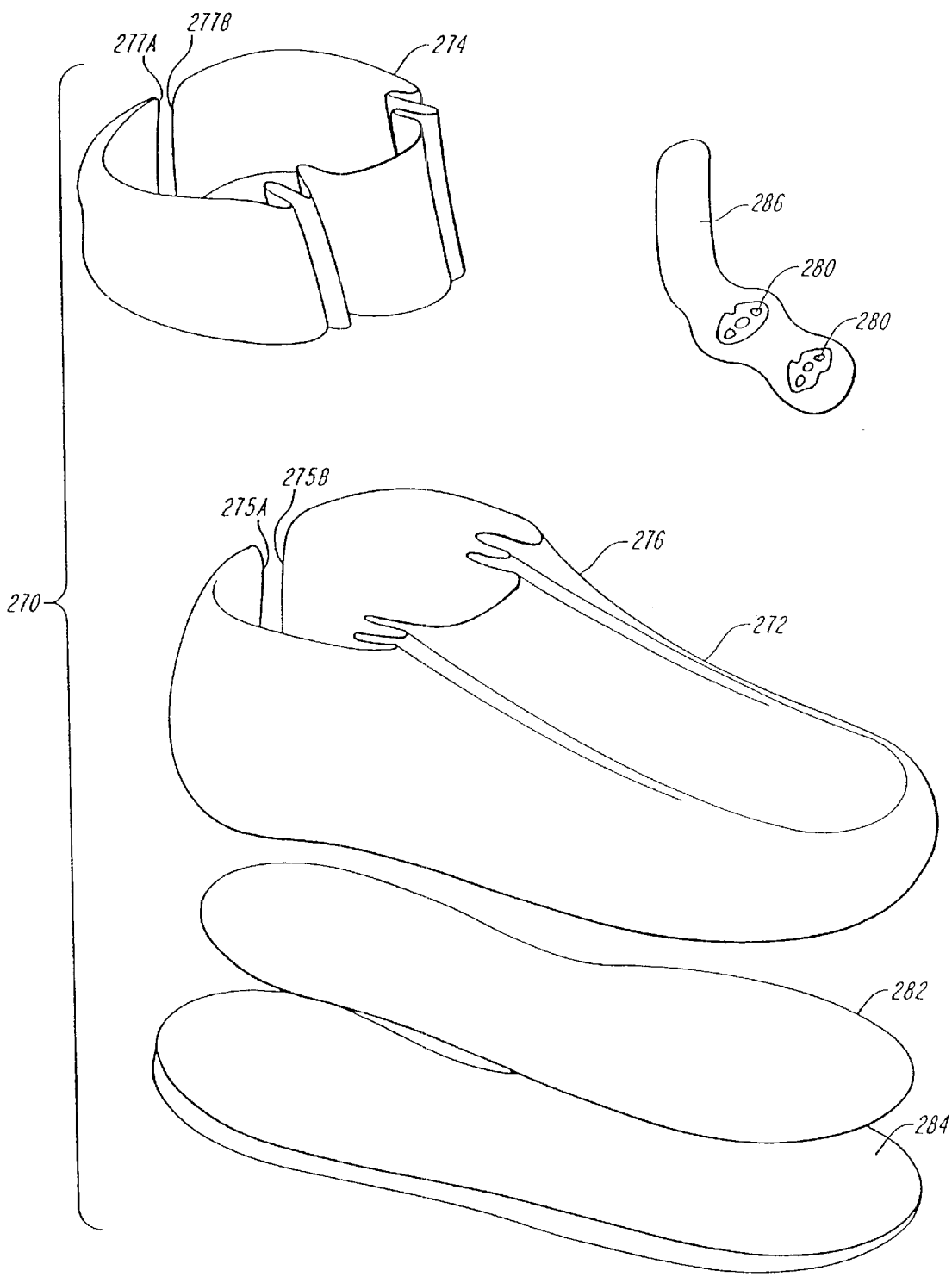
FIG. 8C is an exploded view of the components of a footwear constructed in accordance with a method of manufacturing footwear of the present invention.

Referring to FIGS. 8A–8C, a multi-section composite upper 270 is compression molded into two separate sections, a lower section 272 and a shaft section 274. The composite sheet is compression molded in a mold 260 having a butterfly shaped mold cavity 262 corresponding in size and shape to the lower section of the upper. A separate second mold 263 is used to form the shaft section 274 for the composite upper 270 in a manner analogous to the method of creating the composite upper.

FIG. 8C illustrates the components of the composite upper 270 formed according to the manufacturing methods of the present invention. After compression molding, the butterfly-shaped lower section 272 is folded and assembled along edges 275A and 275B by stitching, by bonding, or by other means. Likewise, the shaft section 274 is folded and assembled along edges 277A and 277B. The shaft section 274 can then be attached to the lower section 272. An integral, gusseted tongue 276 is compression molded into the lower section 272 of the upper 270. A tongue inlay 286, preferably constructed from leather, is positioned within the gusset formed on the tongue 276. The tongue inlay 286 includes eyelets 280 or the like for laces. A sock 282 for lasting is stitched to the lower peripheral edge of the lower section 272 of the composite upper 270. A rubber outsole 284 is applied to the sock 282.

Figure 9:
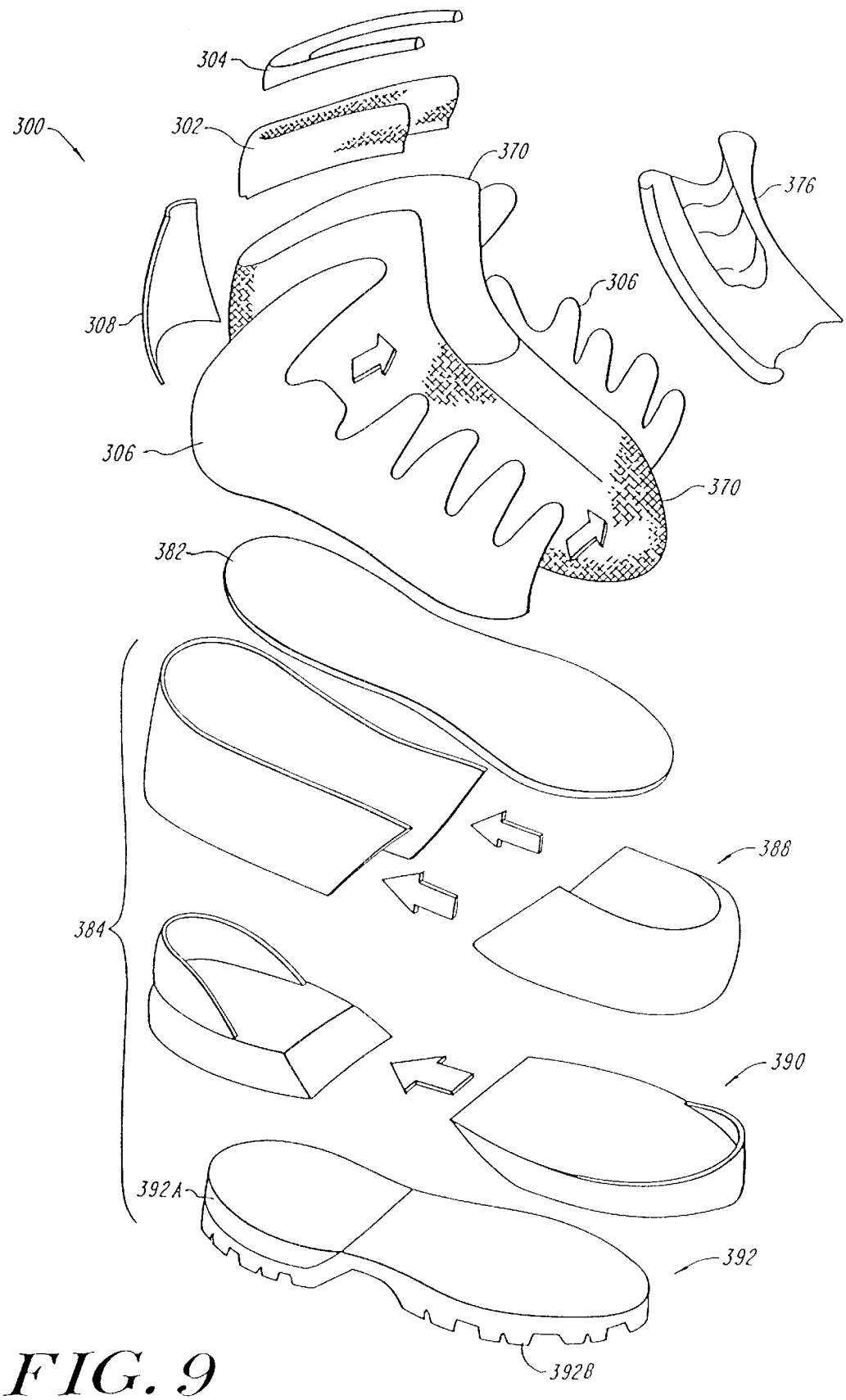
FIG. 9 is an exploded view of a boot constructed in accordance with a method of manufacturing footwear of the present invention.

A exemplary article of footwear, in the form of a mountain boot 300, is illustrated in FIG. 9. The mountain boot 300 includes a composite upper 370 of seamless, unitary construction. An upper composite collar 302 and binding 304 is assembled to the top peripheral edge of the composite upper 370. A tongue 376 is assembled to the upper 370. A pair of molded support plates 306 provide lateral support to the upper 370. Rubbing foxing 308 is provided at the rear of the upper 370. A sock 382 for lasting is stitched to the lower peripheral edge of the composite upper 370. A multi-layer sole unit 384 is applied to the upper 370. The sole unit 384 includes a two-part rubber foxing layer 388, a two-piece TPU frame or flat 390, and a rubber outsole 392. The rubber outsole 392 includes a heel section 392A and a front section 392B, each constructed from rubber having a different density.

Since certain changes may be made in the above constructions without departing from the scope of the invention. It is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A method of manufacturing a section of a footwear upper, the method comprising the steps of:
   providing a composite sheet from plurality of layers including a first layer of thermoplastic foam, a second layer of thermoplastic urethane (TPU), and a third layer of fabric interposed between the first and second layers;
   heating said composite sheet; and
   compression molding said composite sheet into a section of a footwear upper.

2. The method of claim 1, wherein said step of providing the composite sheet comprises the step of laminating said two or more layers to form said composite sheet.

3. The method of claim 2, wherein said plurality of layers are bonded together by a bonding agent.

4. The method of claim 2, wherein said plurality of layers are heated bonded.

5. The method of claim 1, wherein one of said layers of said composite sheet includes a thermoformable material.

6. The method of claim 1, wherein the step of compression molding comprises the steps of
   positioning said composite sheet in a first mold member having a mold cavity, and
   compressing said composite sheet in said mold cavity with a second mold member.

7. The method of claim 6, wherein said step of heating said composite sheet occurs prior to positioning said composite sheet into said first mold member.

8. The method of claim 6, wherein said step of heating said composite sheet occurs after said composite sheet is positioned in said first mold member.

9. The method of claim 1, further comprising the step of cutting said composite sheet into a pre-mold shape analogous in size and shape to the size and shape of said mold cavity.

10. The method of claim 1, further comprising the step of pre-forming said composite sheet into a non-planar configuration.

11. The method of claim 1, further comprising the step of cutting each of said layers of said composite sheet into a pre-mold shape analogous in size and shape to the size and shape of said mold cavity prior to forming said composite sheet.

12. The method of claim 1, wherein the composite sheet is substantially planar.

13. A method of manufacturing footwear comprising the steps of:
constructing a section of a footwear upper by providing a composite sheet from a plurality of layers including a first layer of thermoplastic foam, a second layer of thermoplastic urethane (TPU) and a third layer of fabric interposed between the first and second layers,
heating said composite sheet, and
compression molding said composite sheet into a section of a footwear upper;
providing a sole; and
attaching said upper to said sole.

14. The method of claim 13, wherein said upper is bonded to said sole.

15. The method of claim 13, further comprising the step of assembling an inner liner within said upper.

16. The method of claim 15, wherein said inner liner is a fabric or composite booty.

17. A composite shoot comprising:
a first layer of thermoplastic material, and
a second layer of thermoplastic urethane (TPU) film attached to the first layer, the TPU film comprising a top layer formed of a thermoset urethane and a bottom layer formed of a thermoplastic urethane, the bottom being proximate the first layer of thermoplastic material.

18. The composite sheet of claim 17, wherein the thermoplastic material is a thermoplastic foam.

19. The composite sheet of claim 18, wherein the thermoplastic foam is ethylene vinyl acetate (EVA) foam.

20. The composite sheet of claim 17, wherein the first and second layers are bonded together by a bonding agent.

21. The composite sheet of claim 17, wherein the first and second layers are heat bonded.

22. A composite sheet comprising:
a first layer of thermoplastic material, and
a second layer of thermoplastic urethane (TPU) film attached to the first layer, and
a third layer of fabric interposed between the first and second layers.

23. The composite sheet of claim 22, wherein the fabric is a mesh fabric formed from at least one of the following: nylon, polyester, polycotton, cotton, acetate, and acrylic.

24. A method of manufacturing a composite sheet, the method comprising:
attaching a layer of thermoplastic urethane (TPU) film to a layer of fabric, and
attaching a layer of thermoplastic foam to the layer of fabric.

25. The method of claim 24, wherein attaching the layer of TPU film to the layer of fabric includes bonding the layer of TPU to the layer of fabric with a bonding agent.

26. The method of claim 24, wherein attaching the layer of TPU film to the layer of fabric includes heat bonding the layer of TPU to the layer of fabric.

27. The method of claim 24, wherein attaching the layer of thermoplastic foam to the layer of fabric includes bonding the layer of thermoplastic foam to the layer of fabric with a bonding agent.

28. The method of claim 24, wherein attaching the layer of thermoplastic foam to the layer of fabric includes heat bonding the layer of thermoplastic foam to the layer of fabric.

29. A method of manufacturing a section of a footwear upper, the method comprising:
providing a composite sheet from plurality of layers, including a first layer of thermoplastic foam, a second layer of thermoplastic urethane (TPU), and a third layer of fabric interposed between the first and second layers;
heating the composite sheet to a temperature greater than or equal to a heat activation temperature of the thermoplastic foam; and
compression molding the composite sheet into a section of the footwear upper.

30. The method of claim 29, wherein compression molding comprises
positioning the composite sheet in a first mold member having a mold cavity, and
compressing the composite sheet in the mold cavity with a second mold member.

31. The method of claim 30, wherein heating the composite sheet occurs prior to positioning the composite sheet into the first mold member.

32. The method of claim 30, wherein heating the composite sheet occurs after the composite sheet is positioned in the first mold member.

33. The method of claim 1, wherein the thermoplastic foam is ethylene vinyl acetate (EVA) foam.

34. The method of claim 1, wherein the second layer is a TPU film.

35. The method of claim 1, wherein the TPU film comprises a top layer of formed of a thermoset urethane and a bottom layer formed of a thermoplastic urethane, said bottom layer being proximate the first layer of thermoplastic foam.

36. The method of claim 1, wherein the fabric is a mesh fabric formed from nylon, polyester, polycotton, cotton, acetate, or acrylic.

* * * * *

UNITED STATES PATENT AND TRADEMARK OFFICE
CERTIFICATE OF CORRECTION

PATENT NO.    : 6,670,029 B2
DATED         : December 30, 2003
INVENTOR(S)   : Norton et al.

It is certified that error appears in the above-identified patent and that said Letters Patent is hereby corrected as shown below:

Title Page,
Item [45], Date of Patent, replace "**xwx.-99,-9999" with -- December 30, 2003 --

Signed and Sealed this

First Day of June, 2004

JON W. DUDAS
*Acting Director of the United States Patent and Trademark Office*